US008655526B2

(12) United States Patent
Schwenke et al.

(10) Patent No.: US 8,655,526 B2
(45) Date of Patent: Feb. 18, 2014

(54) METHOD AND APPARATUS FOR CONTROLLING OPERATION OF A HYBRID POWERTRAIN DURING A KEY-ON CRANK START EVENT

(75) Inventors: R. Travis Schwenke, Springboro, OH (US); Kevin J. Smith, Howell, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 534 days.

(21) Appl. No.: 12/985,526

(22) Filed: Jan. 6, 2011

(65) Prior Publication Data

US 2012/0179312 A1 Jul. 12, 2012

(51) Int. Cl.
*G06F 17/00* (2006.01)

(52) U.S. Cl.
CPC ..................................... *G06F 17/00* (2013.01)
USPC ............................................. 701/22; 701/113

(58) Field of Classification Search
USPC ............ 701/22, 101, 113; 123/179.28, 179.3; 180/65.28; 290/40 C; 903/903
See application file for complete search history.

(56) References Cited

U.S. PATENT DOCUMENTS

| 6,286,470 | B1 | 9/2001 | Riksen et al. |
| 6,335,574 | B1* | 1/2002 | Ochiai et al. ................. 290/40 C |
| 6,889,645 | B2* | 5/2005 | Tumback et al. .......... 123/179.3 |
| 7,013,213 | B2* | 3/2006 | McGee et al. ................. 701/113 |
| 7,722,498 | B2* | 5/2010 | Kawasaki et al. ............. 701/101 |
| 2006/0016412 | A1* | 1/2006 | Butcher et al. ............. 123/179.3 |
| 2008/0045382 | A1 | 2/2008 | Kawasaki et al. |
| 2009/0140521 | A1* | 6/2009 | Bryan et al. .................... 290/31 |
| 2010/0250039 | A1* | 9/2010 | Bryan et al. .................... 701/22 |

FOREIGN PATENT DOCUMENTS

| DE | 19841752 A1 | 3/2000 |
| DE | 102007005241 | 8/2008 |

* cited by examiner

*Primary Examiner* — Helal A Algahaim
*Assistant Examiner* — Dale W Hilgendorf

(57) ABSTRACT

A method for starting an internal combustion engine in a hybrid powertrain having an electric torque machine mechanically coupled to the internal combustion engine includes monitoring a temperature state of the hybrid powertrain, determining a maximum discharging power limit of the high-voltage battery corresponding to the temperature state of the hybrid powertrain, estimating an engine drag torque associated with the temperature state of the hybrid powertrain, selecting a preferred engine cranking speed associated with the estimated engine drag torque and achievable at less than the maximum discharging power limit of the high-voltage battery, and controlling the electric torque machine to generate a magnitude of motor torque output sufficient to crank the internal combustion engine at the preferred engine cranking speed.

17 Claims, 3 Drawing Sheets

METHOD AND APPARATUS FOR CONTROLLING OPERATION OF A HYBRID POWERTRAIN DURING A KEY-ON CRANK START EVENT

TECHNICAL FIELD

This disclosure is related to control systems for internal combustion engines and hybrid powertrain systems.

BACKGROUND

The statements in this section merely provide background information related to the present disclosure and may not constitute prior art.

Known hybrid powertrain architectures include torque-generative devices, including internal combustion engines and non-combustion torque machines, e.g., electric machines, which can transmit tractive torque to an output member preferably through a transmission device. One exemplary hybrid powertrain includes a two-mode, compound-split, electro-mechanical transmission which utilizes an input member for receiving tractive torque from a prime mover power source, preferably an internal combustion engine, and an output member. The output member can be operatively connected to a driveline for a motor vehicle for transmitting tractive torque thereto. The electric machines are operative as motors or generators and can be controlled to generate torque inputs to the transmission independently of a torque input from the internal combustion engine. The electric machines may transform engine mechanical power and vehicle kinetic energy transmitted through the vehicle driveline to electrical energy that is storable in an electrical energy storage device. A control system monitors various inputs from the vehicle and the operator and provides operational control of the powertrain, including controlling transmission operating range state and gear shifting, controlling the torque-generative devices, and regulating the electrical power interchange between the electrical energy storage device and the electric machine to manage outputs of the transmission, including torque and rotational speed.

Known hybrid powertrain systems operate electric machines as motors to generate torque inputs to crank and start the internal combustion engine. This includes executing a key-on engine start event and an autostart event during ongoing vehicle operation. A key-on engine start event can include a cold-start, wherein the internal combustion engine, the electric machine, and/or the electrical energy storage devices are at or near an ambient temperature.

Power limits and electrical power flow capabilities of known electrical energy storage devices are constrained at low ambient temperatures. It is known that magnitude of torque required to crank and start an internal combustion engine increases at lower engine and ambient temperatures, thus affecting cold-starting capability of an internal combustion engine.

Known internal combustion engines include direct-fuel-injection systems having high-pressure fuel systems. A high-pressure fuel system may be limited in the mass of pressurized fuel that is delivered under low power conditions and cold ambient conditions, including during engine cranking events. Engine and operating conditions may require extended crank times to achieve sufficient fuel pressure to fuel the engine. Known direct-fuel-injection systems may employ a second low-pressure fuel pump that operates during cold engine starting events to achieve sufficient fuel pressure to fuel the engine.

SUMMARY

A hybrid powertrain includes an electric torque machine mechanically coupled to an internal combustion engine and electrically coupled to a high-voltage battery via an inverter. A method for starting the internal combustion engine includes monitoring a temperature state of the hybrid powertrain, determining a maximum discharging power limit of the high-voltage battery corresponding to the temperature state of the hybrid powertrain, estimating an engine drag torque associated with the temperature state of the hybrid powertrain, selecting a preferred engine cranking speed associated with the estimated engine drag torque and achievable at less than the maximum discharging power limit of the high-voltage battery, and controlling the electric torque machine to generate a magnitude of motor torque output sufficient to crank the internal combustion engine at the preferred engine cranking speed.

BRIEF DESCRIPTION OF THE DRAWINGS

One or more embodiments will now be described, by way of example, with reference to the accompanying drawings, in which.

DETAILED DESCRIPTION

Figure 1:
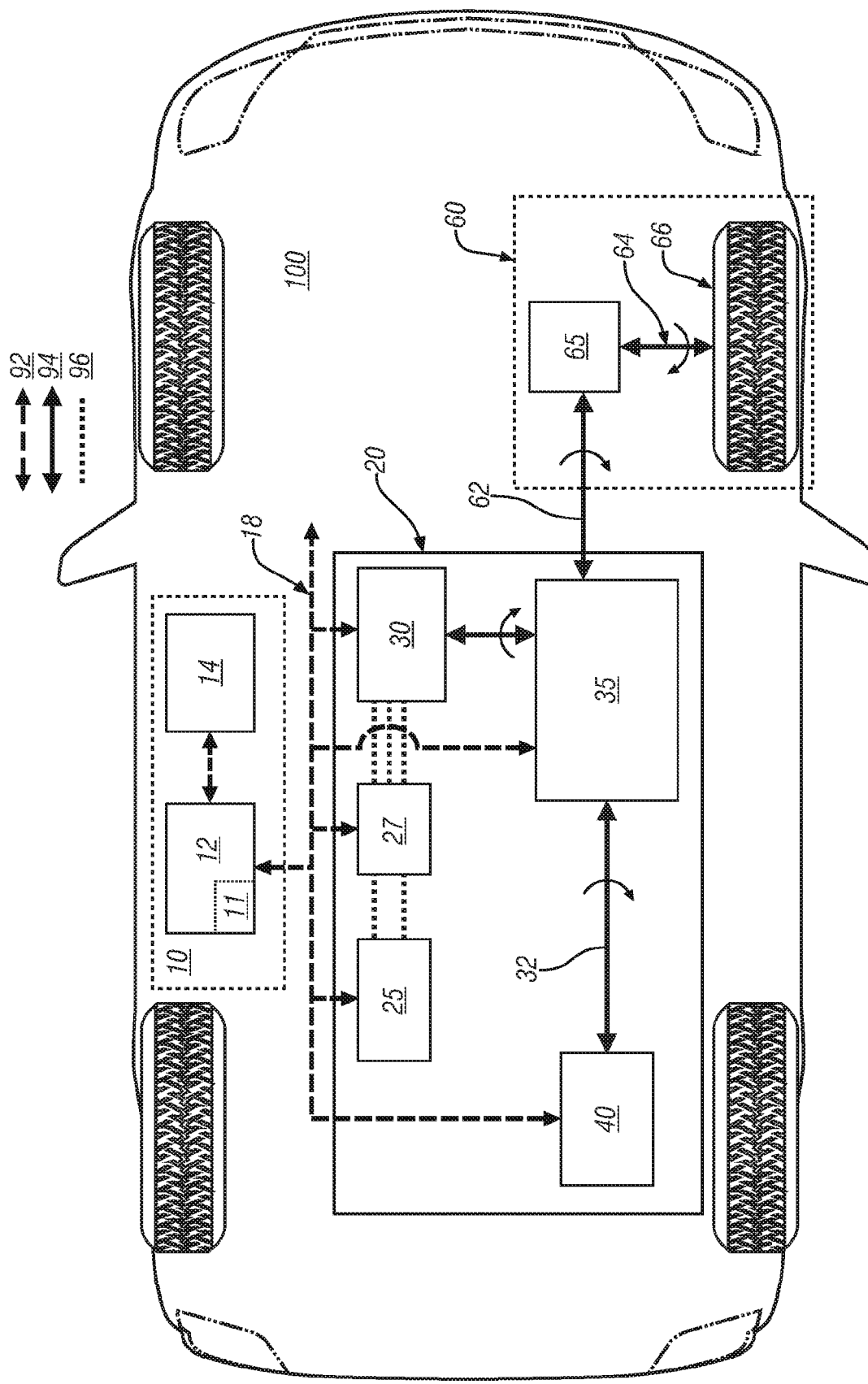
FIG. 1 schematically shows a diagram of a vehicle including a hybrid powertrain system having an engine, transmission, torque machine, and a driveline in accordance with the present disclosure.

Referring now to the drawings, wherein the showings are for the purpose of illustrating certain exemplary embodiments only and not for the purpose of limiting the same, FIG. 1 schematically shows a vehicle 100 including a control system 10, a hybrid powertrain system 20, and a driveline 60. Like numerals refer to like elements in the description. The hybrid powertrain system 20 includes an internal combustion engine 40, hereafter referred to as engine 40, and torque machine(s) 30 that mechanically couple to a transmission 35. The control system 10 communicates with elements of the hybrid powertrain system 20 via any suitable communications devices 92, including e.g., a high speed communications bus 18. The engine 40, torque machine(s) 30, transmission 35 and driveline 60 are configured to transfer torque therebetween using suitable mechanical coupling devices 94, including, e.g., input member 32, output member 62, and shaft 64. High-voltage electric power is transferred using suitable high-voltage power buses 96.

The engine 40 converts fuel stored in a fuel tank to mechanical power through a combustion process. The engine 40 is any suitable internal combustion engine, and is preferably a multi-cylinder direct fuel injection internal combustion engine. The engine 40 is equipped with a plurality of actuators and sensing devices for monitoring operation and delivering fuel to form a combustion charge to produce torque that is responsive to an operator torque request. In one embodiment, the engine 40 is configured to operate as a spark-ignition engine with timing of combustion and the associated engine torque being controlled by advancing or retarding spark ignition timing. Alternatively, the engine 40 is configured to operate as a compression-ignition engine with timing of combustion and the associated engine torque controlled by advancing or retarding timing of fuel injection events. It is appreciated that there is a preferred combustion timing associated with engine operation corresponding to a best fuel efficiency point for an engine operating point. In one embodiment this best fuel efficiency point is referred to as a maximum-best torque (MBT) point. Engine sensing devices preferably include a temperature sensor configured to monitor coolant temperature and a crank position sensor configured to monitor rotational speed of the engine. Engine actuators preferably include fuel injectors, air flow controllers, spark-ignition systems on engines so equipped, and other devices associated with controlling engine operation to control the aforementioned engine states. This includes controlling engine operation to achieve an MBT point, as previously described. This includes controlling timing of combustion and corresponding torque output from the engine 40 by advancing or retarding spark ignition timing. Alternatively, this includes controlling timing of combustion corresponding torque output from the engine 40 by advancing or retarding timing of fuel injection events. Actuators associated with the transmission 35 include, e.g., solenoid devices for actuating torque transfer clutches to effect operation of the transmission in specific range states including, e.g., fixed gear operating states and electrically variable mode operating states.

A high-voltage battery 25 stores potential electric energy and is electrically connected via an inverter 27 to the torque machine(s) 30 to transfer electric power therebetween using a suitable configuration, e.g., high-voltage electric power buses 96. The high-voltage battery 25 is any suitable electric energy storage device that can include a plurality of electrical cells, ultracapacitors, and other devices configured to store electric energy on-vehicle. One exemplary high-voltage battery 25 includes a plurality of lithium-ion cells. The high-voltage battery 25 preferably includes a temperature sensor configured to monitor operating temperature thereof. Parametric states associated with the high-voltage battery 25 include a state-of-charge, temperature, available voltage, and available battery power, which are monitored by the control system 10. The available battery power describes battery power limits that include an allowable range between a minimum and maximum allowable battery power, described as a maximum charge power and a maximum discharge power. It is appreciated that the battery power is measured in terms of a parameter that can be regularly monitored, e.g., state of charge (SOC), or another suitable parameter. The allowable battery power limits are preferably established at threshold levels to prevent either overcharging or overdischarging of the high-voltage battery 25 to prevent damage that reduces service life thereof.

The torque machine(s) 30 preferably include multi-phase electric motor/generators electrically connected to the inverter 27. The torque machine(s) 30 interacts with the inverter 27 to convert stored electric energy to mechanical power and convert mechanical power to electric energy that can be stored in the high-voltage battery 25.

Mechanical power originating in the engine 40 can be transferred to the output member 62 and the torque machine(s) 30 via input member 32 and using the transmission 35. Operating parameters associated with such input power from the engine 40 include engine torque and engine speed.

Mechanical power originating from the torque machine(s) 30 can be transferred to the output member 62 and the engine 40 using the transmission 35. Operating parameters associated with such mechanical power transfer include motor torque and motor speed. It is appreciated that the torque machine(s) 30 can be configured to transfer mechanical power to crank the engine 40 using power transfer mechanisms including, e.g., a direct gear drive system and a belt-drive system.

Mechanical power can be transferred between the transmission 35 and the driveline 60 via the output member 62. Operating parameters associated with such mechanical power transfer include output torque and output speed.

The driveline 60 can include a differential gear device 65 that mechanically couples to axle 64 or half-shaft that mechanically couples to a wheel 66 in one embodiment. The driveline 60 transfers tractive power between the transmission 35 and a road surface.

The control system 10 includes a control module 12 that is signally connected to an operator interface 14. The control module 12 includes a control scheme 11 to control operation of the powertrain system 20. The control scheme 11 controls operation of the hybrid powertrain system 20 during an engine start event and is in the form of executable algorithmic code and calibrations. An operator interface system 14 includes plurality of human/machine interface devices through which the vehicle operator commands operation of the vehicle 100, including, e.g., a starter switch to enable an operator to key-on, crank and start the engine 40, an accelerator pedal, a brake pedal, and a transmission range selector (PRNDL). Although the control module 12 and operator interface 14 are shown as individual discrete elements, such an illustration is for ease of description. It is appreciated that the functions described as being performed by the control module 12 may be combined into one or more devices, e.g., implemented in software, hardware, and/or application-specific integrated circuitry (ASIC) and ancillary circuits that are separate and distinct from the control module 12. It is appreciated that information transfer to and from the control module 12 can be accomplished using one or more communications paths, e.g., communications bus 18, which can include one or more of a direct connection, a local area network bus, and a serial peripheral interface bus.

The control module 12 preferably signally and operatively connects to individual elements of the hybrid powertrain system 20 via the communications bus 18. The control module 12 signally connects to the sensing devices of each of the high-voltage battery 25, torque machine(s) 30, engine 40, the inverter(s) 27 and the transmission 35 to monitor operation and determine parametric states thereof. Monitored parametric states of the engine 40 preferably include engine speed, engine torque or load, and temperature. Monitored parametric states of the transmission 35 preferably include rotational speed, and hydraulic pressure at a plurality of locations, from which parametric states including application of specific torque transfer clutches can be determined. Monitored parametric states of the torque machine(s) 30 preferably include speed(s) and power flow(s), e.g., electric current flow, from which a parametric state for motor torque(s) output from the torque machine(s) 30 can be determined. Monitored parametric states of the high-voltage battery 25 include battery power and battery temperature.

The control module 12 operatively connects to the actuators of each of the torque machine(s) 30, the engine 40, and the transmission 35 to control operation thereof in accordance with executed control schemes that are stored in the form of algorithms and calibrations. The actuators associated with the torque machine(s) 30 preferably include inverter(s) 27. It is appreciated that the inverter(s) 27 transforms electric power in a manner suitable for generating torque with the torque machine(s) 30, and transforms mechanical power in a manner suitable for generating electric power with the torque machine(s) 30, depending upon operating conditions. It is appreciated that the control module 12 controls the inverter(s) 27 to control electric power flow between the high-voltage battery 25 and the torque machine(s) 30, including controlling electric current flow that discharges the high-voltage battery 25 to generate tractive power in the torque machine(s) 30. It is appreciated that the control module 12 controls the inverter(s) 27 to control electric power flow between the high-voltage battery 25 and the torque machine(s) 30 including transforming torque input to the torque machine(s) 30 to electric current flow to charge the high-voltage battery 25. Transforming the torque input to the torque machine(s) 30 to generate electric current flow to charge the high-voltage battery 25 includes transforming either or both the engine torque from the engine 40 and regenerative braking torque from the driveline 60.

The control module 12 executes control schemes to control operation of the engine 40 coordinated with controlling overall operation of the hybrid powertrain system 20 to manage transfer of mechanical power to the driveline 60 and to manage electric power flow to the high-voltage battery 25. Such control schemes include balancing operation of the engine 40 with allowable battery power limits associated with the high-voltage battery 25 while achieving an output torque to the driveline 60 that is responsive to an operator torque request. This includes controlling operation of the engine 40 to achieve a preferred engine speed associated with a peak or otherwise preferred efficiency.

A key-on engine start event is executed in response to an operator input to the starter switch, for example when an operator first enters a vehicle to begin a trip. It is appreciated that a key-on engine start event includes a remote-start event and other similar operations. The control system 10 controls the torque machine(s) 30 to transfer mechanical power to crank the engine 40, either directly or via the transmission 35. It is appreciated that the key-on engine start event includes executing other engine control functions related to cranking, fueling and firing the engine 40.

Figure 2:
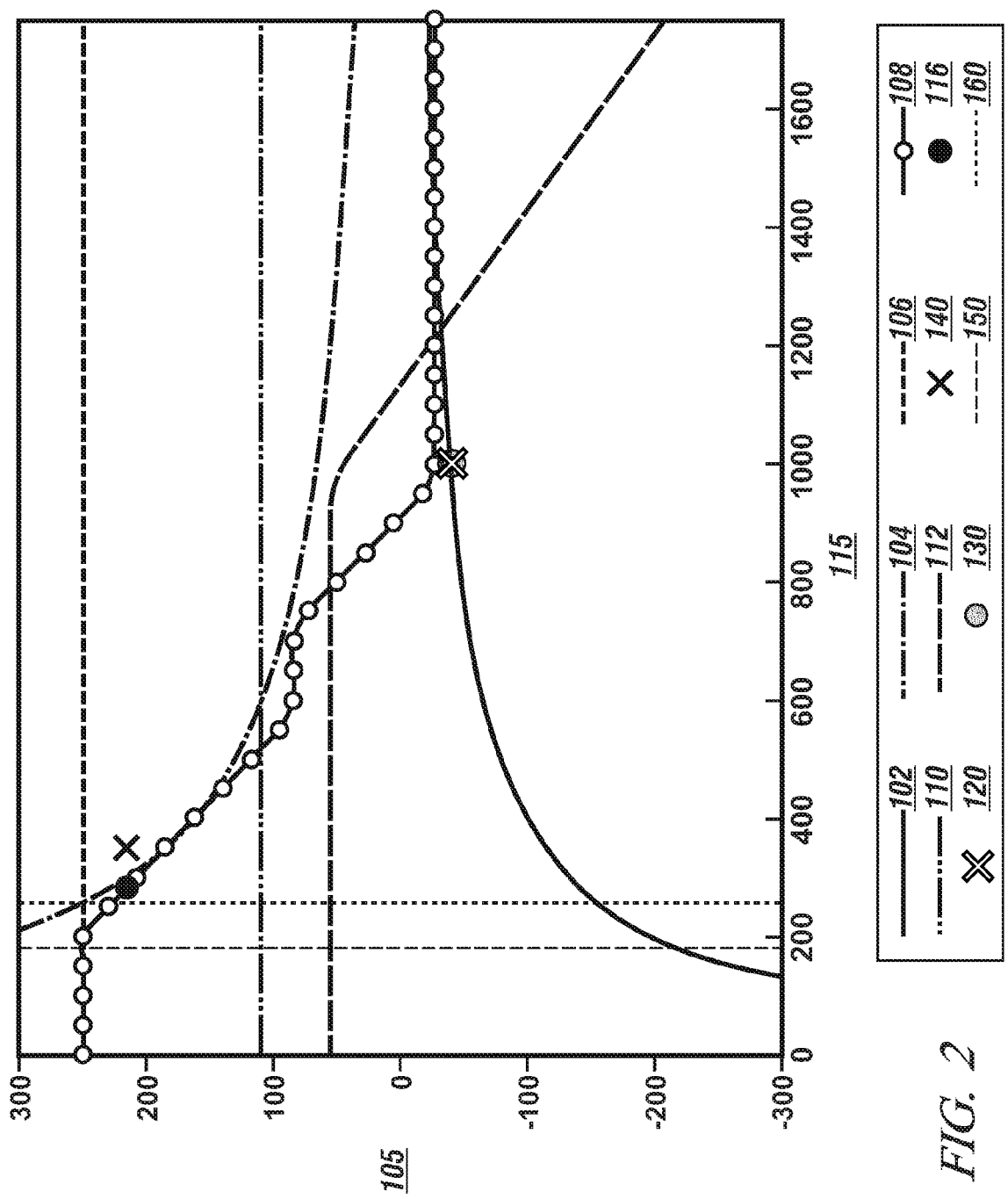
FIG. 2 graphically shows an engine speed/torque calibration for executing an engine start in response to a key-on engine starting command for a hybrid powertrain system in accordance with the present disclosure.

FIG. 2 graphically shows an engine speed/torque calibration 108 for executing an engine start in response to a key-on engine starting command for a hybrid powertrain system, e.g., the engine 40 of the hybrid powertrain system 20 described with reference to FIG. 1. The engine speed/torque calibration 108 is graphically depicted with torque (in units of N-m) shown on the vertical axis (105) and speed (in units of RPM) shown on the horizontal axis (115). The engine speed/torque calibration 108 may be employed to select a preferred engine cranking speed associated with an estimated engine drag torque taking into account power limits from the high-voltage battery 25 and operation of the hybrid powertrain system 20 including the engine 40 and the torque machine(s) 30.

As depicted, electric discharging and torque generated in the torque machine(s) 30 are depicted as greater than zero, i.e., positive. Similarly, torque expended to spin the engine 40 is also depicted as greater than zero, i.e., positive. As depicted, electric charging and torque absorbed in the torque machine(s) 30 are depicted as less than zero, i.e., negative. Similarly, torque generated by the engine 40 is also depicted as less than zero, i.e., negative. Battery power limits are established to prevent either overdischarging or overcharging of the high-voltage battery 25, and are shown in the form of a maximum discharge power limit 104 and a maximum charge power limit 102. The maximum discharge power limit 104 and maximum charge power limit 102 are determined based upon temperature of the high-voltage battery 25 and other factors appreciated by skilled practitioners. Other factors affecting the preferred engine cranking speed include maximum and minimum system resonant frequencies 160 and 150, respectively, which include an engine speed range between a high engine speed and a low engine speed over which it is preferred that the engine 40 not operate for extended periods of time in order to prevent unacceptable levels of engine-induced vibration in the driveline. Another limitation includes a maximum crank torque 106, which indicates a maximum torque output capability of the torque machine(s) 30 to spin the engine 40. There are limits on expected engine torque 110 and commanded engine torque 112.

The maximum discharge power limit 104 and maximum charge power limit 102, the maximum and minimum system resonant frequencies 160 and 150, respectively, and the maximum crank torque 106 to spin the engine 40 circumscribe a speed and torque operating region for the engine cranking speed, and are used to define the preferred engine cranking speed calibration 108. The preferred engine cranking speed calibration 108 includes a plurality of maximum engine cranking speed states associated with a range of engine drag torques and within battery power limits including the maximum discharge power limit 104 and maximum charge power limit 102, and outside the system resonant frequencies including the maximum and minimum system resonant frequencies 160 and 150, respectively. There may be a single one or a plurality of preferred engine cranking speed calibration(s), each associated with different operating temperatures. The preferred engine cranking speed calibration(s) may include an array(s) of engine cranking speed states associated with cranking torque states, which can be precalibrated and stored in the control module 12 for used during ongoing vehicle operation.

Engine drag torque is a magnitude of applied torque necessary to overcome engine friction, cylinder compression, valve closing spring force, and other resistance sources that affect spinning of a non-firing engine, and can vary with engine speed. The magnitude of engine drag torque can be correlated to engine temperature and other factors, as is appreciated by those skilled in the art. In one embodiment, engine drag torque is estimated using a torque model that can be executed in the control module 12. Alternatively, engine drag torque may be directly measured or otherwise determined during an engine cranking event using a direct torque measurement or another suitable mechanism.

Elements 120 and 130 depict operating points that are within all the aforementioned powertrain operating constraints. Operation of the powertrain system at engine speeds that are greater than the depicted operating speed requires some form of torque mitigation to limit the magnitude of generated engine torque reacted by the torque machine(s) 30 and stored in the high-voltage battery 25. This may include retarding spark ignition timing or retarding timing of fuel injection events to permit engine operation at reduced engine torque output until the temperature of the high-voltage battery 25 has warmed sufficiently to permit increases in the allowable battery power limits Element 140 depicts an operating point that achieves the aforementioned engine operating constraints, but violates the maximum discharge power limit 104, and thus is not an acceptable powertrain operating state for engine starting. Element 116 depicts an operating point analogous to the operating point shown with reference to element 140 that achieves the aforementioned engine operating constraints, is within the maximum discharge power limit 104, and thus is an acceptable powertrain operating state for engine starting, albeit at a reduced engine speed.

Figure 3:
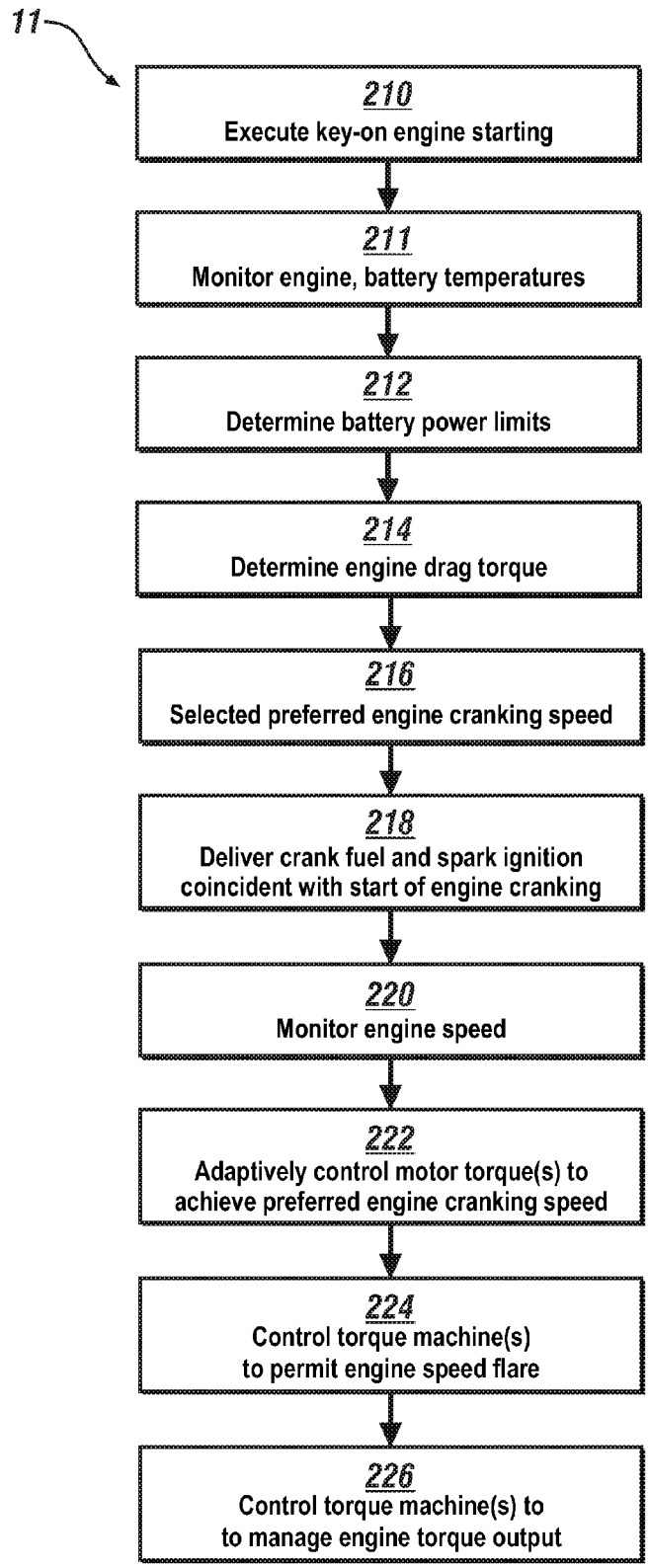
FIG. 3 illustrates in flowchart form a control scheme for executing a key-on engine starting event for a hybrid powertrain system in accordance with the present disclosure.

FIG. 3 illustrates in flowchart form the control scheme 11 executed in the control module 12 related to a starting an internal combustion engine of a hybrid powertrain system in response to a key-on engine starting event (210), e.g., the internal combustion engine 40 of the hybrid powertrain system 20 described with reference to FIG. 1. The key-on engine starting event includes monitoring temperature(s) of the engine 40 and preferably the high-voltage battery 25 (211). Monitoring temperature(s) of the engine 40 can include monitoring coolant temperature or another suitable parameter that indicates engine temperature. Monitoring temperature of the high-voltage battery 25 preferably includes monitoring input from the temperature sensor.

Battery power limits in the form of the maximum discharge power limit 104 and the maximum charge power limit 102 associated with the high-voltage battery 25 correspond to the monitored temperature of the high-voltage battery 25 (212). In one embodiment there is an array of states for the maximum discharge power limit 104 and the maximum charge power limit 102 and an associated array of temperatures that are stored in a memory device for retrieval during the key-on engine starting event. It is appreciated that other system and component temperatures can be monitored and used as substitutes for the monitored temperature of the high-voltage battery 25.

The magnitude of engine drag torque is determined based upon the monitored temperature of the engine 40 (214).

A preferred engine cranking speed is selected (216). The preferred engine cranking speed is selected in relation to the battery power limits including the maximum discharge power limit 104 and the maximum charge power limit 102, the magnitude of engine drag torque, and other information related to overall operation of the hybrid powertrain 100 described with reference to the engine speed/torque calibration 108 set forth with reference to FIG. 2. The selected preferred engine cranking speed is the maximum engine cranking speed achievable while overcoming the engine drag torque without violating the battery power limits at the present temperature of the high-voltage battery 25.

The inverter 27 is controlled to transfer a sufficient magnitude of electric power to the torque machine(s) 30 to generate a motor torque output from the torque machine(s) 30 that overcomes the engine drag torque and spins the engine 40, preferably at the preferred engine cranking speed selected in the foregoing step, i.e., step 216. Crank fuel, and spark ignition on systems so equipped are delivered to the engine 40 during the engine cranking, preferably coincident with the start of the engine cranking (218). One skilled in the art is able to determine the requisite mass of fuel and timing of spark ignition. Engine speed is monitored during the engine cranking (220).

During the engine cranking, the magnitude of the motor torque output from the torque machine(s) 30 is adaptively controlled to achieve the preferred engine cranking speed (222). This operation preferably includes using feedback from the monitored engine speed to control the inverter 27 to control power flow to the torque machine(s) 30.

During the engine cranking, the torque machine(s) 30 is controlled to permit engine speed to increase to a speed that is greater than the preferred engine cranking speed, such as may occur when the engine speed flares upon engine firing (224). Such operation of the torque machine(s) 30 is temporary, and takes into account battery power limits of the high-voltage battery 25. As such, during the engine cranking, the torque machine(s) 30 is not controlled in an electric power-generating mode to limit rotational speed during the engine cranking if such operation results in violating the battery power limits of the high-voltage battery 25.

During the engine cranking and subsequent engine operation, the engine 40 and the torque machine(s) 30 are controlled to manage engine torque output to the torque machine 30 (226). Such operation of the engine 40 is intended to prevent generation of electric power that results in overcharging the high-voltage battery 25. Engine operation subsequent to firing is controlled to limit the engine torque, including limiting magnitude of engine torque that can reacted by the torque machine(s) 30 as constrained by the maximum and minimum power limits 104, 102, respectively, of the high-voltage battery 25. The battery power limits of the high-voltage battery 25 continue to be restricted in relation to the operating temperature of the high-voltage battery 25. As such, the magnitude of generated engine torque reacted by the torque machine(s) 30 and stored in the high-voltage battery 25 must be limited by controlling engine output torque. This includes retarding spark ignition timing or retarding timing of fuel injection events to permit engine operation at reduced engine torque output until the temperature of the high-voltage battery 25 has warmed sufficiently to permit increases in the allowable battery power limits.

Execution of the control scheme 11 permits a key-on engine start event that takes into account available battery power, engine drag torque, and other conditions and allows extended elapsed cranking times to effect engine starting.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method for starting an internal combustion engine in a hybrid powertrain including an electric torque machine mechanically coupled to the internal combustion engine and electrically coupled to a high-voltage battery via an inverter, the method comprising:

monitoring a temperature state of the hybrid powertrain;

determining a maximum discharging power limit of the high-voltage battery corresponding to the temperature state of the hybrid powertrain;

estimating an engine drag torque associated with the temperature state of the hybrid powertrain;

selecting a preferred engine cranking speed associated with the estimated engine drag torque and achievable at less than the maximum discharging power limit of the high-voltage battery, the preferred engine cranking speed comprising a maximum engine cranking speed that is associated with the estimated engine drag torque and a discharge power that is less than the maximum discharging power limit of the high-voltage battery and greater than an engine speed range associated with a system resonant frequency; and controlling the electric torque machine to generate a magnitude of motor torque output to crank the internal combustion engine at the preferred engine cranking speed.

2. The method of claim 1, wherein controlling the electric torque machine to generate the magnitude of motor torque output to crank the internal combustion engine at the preferred engine cranking speed comprises:
monitoring a rotational speed of the engine; and
adaptively commanding the magnitude of motor torque output from the electric torque machine to crank the internal combustion engine at the preferred engine cranking speed responsive to the monitored rotational speed of the engine.

3. The method of claim 1, further comprising delivering crank fuel to the engine coincident with controlling the electric torque machine to generate the magnitude of motor torque output to crank the internal combustion engine at the preferred engine cranking speed.

4. The method of claim 1, further comprising controlling the electric torque machine to permit an engine speed greater than the preferred engine cranking speed.

5. The method of claim 1, further comprising limiting an engine torque output to the electric torque machine to limit charging of the high-voltage battery within a maximum charging power limit for the high-voltage battery subsequent to an engine firing.

6. The method of claim 5, wherein limiting the engine torque output to the electric torque machine to limit charging of the high-voltage battery within the maximum charging power limit for the high-voltage battery subsequent to the engine firing comprises controlling at least one of an engine spark timing and a fuel injection timing.

7. The method of claim 1, wherein monitoring the temperature state of the hybrid powertrain comprises monitoring at least one of an engine coolant temperature and a high-voltage battery temperature.

8. Method for starting an internal combustion engine in a hybrid powertrain including an electric torque machine mechanically coupled to the internal combustion engine and electrically coupled to a high-voltage battery via an inverter, the method comprising:
in response to a key-on engine starting command:
monitoring a temperature state of the hybrid powertrain;
determining maximum and minimum power limits of the high-voltage battery corresponding to the temperature state of the hybrid powertrain;
estimating an engine drag torque associated with the temperature state of the hybrid powertrain;
selecting a preferred engine cranking speed associated with the estimated engine drag torque and achievable within the maximum and minimum power limits of the high-voltage battery, the preferred engine cranking speed comprising a maximum engine cranking speed that is associated with the estimated engine drag torque and a discharge power that is less than the maximum discharging power limit of the high-voltage battery and greater than an engine speed range associated with a system resonant frequency; and
controlling the electric torque machine to generate a magnitude of motor torque output to crank the internal combustion engine at the preferred engine cranking speed.

9. The method of claim 8, wherein controlling the electric torque machine to generate the magnitude of motor torque output to crank the internal combustion engine at the preferred engine cranking speed comprises:
monitoring a rotational speed of the engine; and
adaptively commanding the magnitude of motor torque output from the electric torque machine to crank the internal combustion engine at the preferred engine cranking speed responsive to the monitored rotational speed of the engine.

10. The method of claim 8, further comprising delivering crank fuel to the engine coincident with commanding the magnitude of motor torque output from the electric torque machine to crank the internal combustion engine at the preferred engine cranking speed.

11. The method of claim 8, further comprising controlling the electric torque machine to permit an engine speed greater than the preferred engine cranking speed.

12. The method of claim 8, further comprising limiting an engine torque output to the electric torque machine to limit charging of the high-voltage battery within the minimum power limit for the high-voltage battery subsequent to an engine firing.

13. The method of claim 12, wherein limiting the engine torque output to the electric torque machine to limit charging of the high-voltage battery within the minimum power limit for the high-voltage battery subsequent to the engine firing comprises controlling at least one of an engine spark timing and a fuel injection timing.

14. The method of claim 8, wherein monitoring a temperature state of the hybrid powertrain comprises monitoring at least one of an engine coolant temperature and a high-voltage battery temperature.

15. Method for starting a hybrid powertrain including an electric torque machine mechanically coupled to an internal combustion engine and electrically coupled to a high-voltage battery via an inverter, the method comprising:
commanding starting of the internal combustion engine;
monitoring at least one of an engine coolant temperature and a high-voltage battery temperature;
determining a maximum discharging power limit of the high-voltage battery corresponding to the monitored temperature;
estimating an engine drag torque associated with the monitored temperature;
selecting a preferred engine cranking speed associated with the estimated engine drag torque and achievable at less than the maximum discharging power limit of the high-voltage battery, the preferred engine cranking speed comprising a maximum engine cranking speed that is associated with the estimated engine drag torque and a discharge power that is less than the maximum discharging power limit of the high-voltage battery and greater than an engine speed range associated with a system resonant frequency;
controlling the electric torque machine to generate a magnitude of motor torque output to crank the internal combustion engine at the preferred engine cranking speed;
delivering crank fuel to the engine coincident with controlling the electric torque machine to generate the magnitude of motor torque output to crank the internal combustion engine at the preferred engine cranking speed; and
limiting an engine torque output to the electric torque machine to limit charging of the high-voltage battery within a maximum charging power limit for the high-voltage battery subsequent to an engine firing.

16. The method of claim 15, wherein controlling the electric torque machine to generate the magnitude of motor torque output to crank the internal combustion engine at the preferred engine cranking speed comprises:
monitoring a rotational speed of the engine; and
adaptively commanding the magnitude of motor torque output from the electric torque machine to crank the internal combustion engine at the preferred engine cranking speed responsive to the monitored rotational speed of the engine.

17. The method of claim 15, wherein limiting the engine torque output to the electric torque machine to limit charging of the high-voltage battery within the maximum charging power limit for the high-voltage battery subsequent to the engine firing comprises controlling at least one of an engine spark timing and a fuel injection timing.

\* \* \* \* \*